United States Patent [19]
Draber

[11] Patent Number: 6,065,133
[45] Date of Patent: May 16, 2000

[54] METHOD FOR DETERMINING RELIABILITY CHARACTERISTICS FOR A TECHNICAL INSTALLATION

[75] Inventor: Silke Draber, Baden, Switzerland

[73] Assignee: ABB Research Ltd., Zurich, Switzerland

[21] Appl. No.: 09/050,903

[22] Filed: Mar. 31, 1998

[30]  Foreign Application Priority Data

Apr. 4, 1997 [DE] Germany ............................ 197 13 917

[51] Int. Cl.$^7$ .................................................. G06F 11/00
[52] U.S. Cl. .................................. 714/1; 714/26; 706/45
[58] Field of Search ............................... 395/180, 182.01, 395/183.13, 183.17; 364/186–189; 714/1, 3, 37, 38, 41

[56]  References Cited

U.S. PATENT DOCUMENTS

| | | | |
|---|---|---|---|
| 5,014,220 | 5/1991 | McMann et al. | 364/573 |
| 5,586,252 | 12/1996 | Barnard et al. | 395/185.01 |
| 5,786,993 | 7/1998 | Frutiger et al. | 364/140 |
| 5,805,898 | 9/1998 | Barsness et al. | 395/712 |

FOREIGN PATENT DOCUMENTS

| | | |
|---|---|---|
| 0494788A1 | 7/1992 | European Pat. Off. . |
| 2739044 | 3/1979 | Germany . |
| 3705964A1 | 9/1988 | Germany . |
| 3800147A1 | 7/1989 | Germany . |
| 3933958A1 | 4/1991 | Germany . |
| 4124542A1 | 2/1992 | Germany . |
| WO90/09644 | 8/1990 | WIPO . |

OTHER PUBLICATIONS

"Effiziente Instandhaltungsplanung fur Montageanlagen", Wiendahl, et al., MONTAGE, No. 11/12, 1994, pp. 68–73.
"Modellgestutzte Uberwachung und Fehlerdiagnose Technischer Systeme (Teil 1)", Isermann, atp 38, May 1996, pp. 9–20.
"Wissensbasierte Systemanalyse", FMEA, 1995, pp. 714–718.
"Ein Beispiel zur logikbasierten Prozessdiagnose", Lunze, et al., atp May 1996, pp. 26–34.
"Database Design for Failure Modes and Effects Analysis", Kukkal, et al., 1993 Proceedings, Annual Reliability and Maintainability Symposium, pp. 231–239.
"Statistical Model for a Failure Mode and Effects Analysis and its Application to Computer Fault–Tracing", Ohlef, et al., IEEE Transactions on Reliability, vol. R–27, Apr. 1978, pp. 16–22.
"Qualitat und Zuverlassigkeit technischer system", Birolini, 1988, pp. 63–66.
"Dependability Evaluation of a Computering System for Traction Control of Electrical Locomotives" (Industrial track paper), Silke Draber, pp. 128–140.

*Primary Examiner*—Dieu-Minh T. Le
*Attorney, Agent, or Firm*—Burns, Doane, Swecker & Mathis, L.L.P.

[57]  ABSTRACT

In a method for determining reliability characteristics for a technical installation, a single FMEA table covering all configurations is initially produced for the whole installation. In its lines, i.e. the description of faults and their consequences, the table also has the rate constants, test periods, repair times and consequences of failure, which are dependent on the configuration of the installation. The table explicitly records how the configuration-dependent entries depend on the respective configuration of the installation. In a further step, configuration-specific FMEA tables geared to a specific configuration of the installation can be extracted from this table. Using the configuration-specific FMEA tables, after conversion into Markov models, reliability characteristics can be calculated for the installation in the particular configuration. (FIG. 1)

4 Claims, 1 Drawing Sheet

METHOD FOR DETERMINING RELIABILITY CHARACTERISTICS FOR A TECHNICAL INSTALLATION

BACKGROUND OF THE INVENTION

1. Field of the invention

The invention relates to the field of reliability engineering. It is based on a method for determining reliability characteristics for a technical installation on the basis of the preamble to the first claim.

2. Discussion of background

A generic method has already been described in Lecture Notes in Computer Science 1150, Dependable Computing—EDCC—2, "Reliability Evaluation of a Computing System for Traction Control of Electrical Locomotives", pages 129–140, Springer Verlag, October 1996, by Silke Draber and Bernhard Eschermann.

An FMEA table is initially produced for the technical installation. FMEA tables are understood to be a list of the failure modes, failure probabilities and failure effects of all the relevant components of an installation (FMEA=Failure Modes and Effects Analysis). Using this information, it is possible to calculate the reliability characteristics (e.g. MTTF "Mean Time to Failure"). Details on how an FMEA table is produced can be found in the book "Qualitat und Zuverlassigkeit technischer Systeme" [Quality and reliability of technical systems] by A. Birolini, Springer-Verlag 1988, 2nd edition, pages 63–66. In order to calculate the reliability characteristics, the FMEA tables produced are converted into a Markov model in a subsequent step, and this can be used to calculate the characteristics.

Reliability characteristics for a technical installation are very important for the design of the installation. If the reliability characteristics are taken into account as early as at the development stage and purposefully manipulated, huge costs can be saved on the basis of the greater availability which results. Thus, for example, the analysis of reliability characteristics makes it possible to design identified weaknesses in the installation to be redundant, or to reinforce them. For this reason, it is judicious to produce FMEA tables throughout development and to calculate reliability characteristics, so that the reliability of various installation configurations can be compared. On the basis of the prior art, an FMEA table would have to be produced and reliability characteristics determined by calculation for each installation configuration separately, since failure modes, rates, probabilities and the effects of failure depend on the configuration of the installation. In a very simple installation, this can still be done using only a handful of installation configurations. In industrial practice, however, the number of configurations for the installation that have to be compared with one another using reliability characteristics is often multitudinous. Hundreds, if not thousands, of installation configurations result which it is virtually impossible to represent without computer assistance, without mentioning the fact that a specific FMEA table can be produced for each of these configurations.

The amount of work involved is so great that it is virtually impossible to avoid errors. In addition, a small modification at one point involves numerous adjustments at other points, so that calculation of the reliability characteristics becomes very inflexible. Particularly for automatic calculation of the reliability characteristics for all installation configurations of a technical installation, it would therefore be desirable if the amount of effort required could be reduced.

SUMMARY OF THE INVENTION

Accordingly, one object of the invention is to provide a novel method for determining reliability characteristics for all installation configurations of a technical installation, by means of which method the amount of work involved, even for more complicated installations, can be kept so low that reliability analyses can be carried out for various configurations of the installation.

This object is achieved with a method of the type mentioned in the introduction by means of the features of the first claim.

The essence of the invention, therefore, is that a single FMEA table is initially produced for all configurations of the installation. In its lines, i.e. the description of faults and their consequences, the table has the rate constants, test periods, repair times and consequences of failure which are dependent on the configuration of the installation. The table explicitly records how the configuration-dependent entries depend on the respective configuration of the installation. In the following text, such an FMEA table is called an FMEA table covering all configurations. There is therefore no longer any need to produce a large number of specific FMEA tables, but instead only a single FMEA table covering all configurations. In a further step, configuration-specific FMEA tables geared to a specific configuration of the installation can be extracted from this table. Using the configuration-specific FMEA tables, after conversion into a Markov model, reliability characteristics can be calculated for the particular configuration of the installation.

In order to make it easier to produce the FMEA table covering all configurations, it is advantageous to subdivide the technical installation into a number of subsystems. Individual FMEA subsidiary tables are then produced for these subsystems and can be combined to form the FMEA table covering all configurations. Global configurations are understood in the following text to be configurations of the whole installation, whilst local configurations describe the configuration of the subsystems. Each global configuration corresponds to a combination of local configurations. A technical installation can therefore theoretically be located in a virtually infinite number of global configurations. Many of the theoretically possible global configurations make no sense technically, however, but rather the local configurations of the subsystems interact with one another in accordance with a limited number of rules. These rules can be recorded in a rule base. Hence, before the reliability characteristics are calculated, the rule base can be used to check whether the global configuration under consideration is at all compliant with the rules. By using a rule base, the number of possible global configurations can thus be drastically reduced. This is also a prerequisite for the subsequent graphical display, which can be used to select the suitable configuration.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
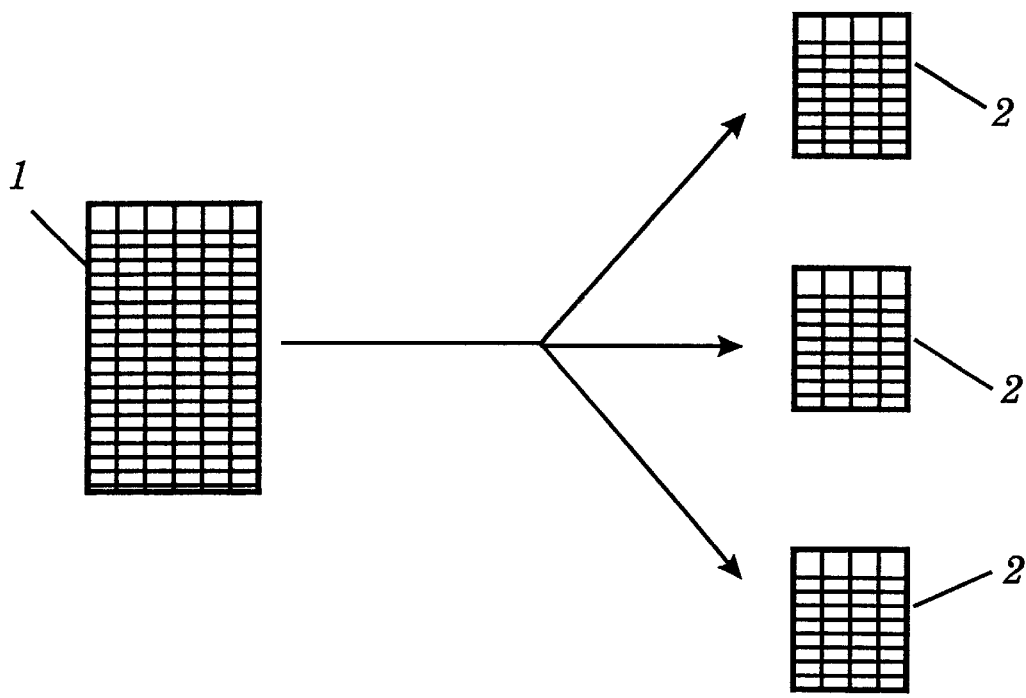
FIG. 1 shows a schematic illustration of the extraction of the configuration-specific FMEA tables from the FLEA table, covering all configurations, for the whole installation.

The reference numerals used in the drawings and their meaning are listed in summarized form in the list of designations.

DESCRIPTION OF THE PREFERRED EMBODIMENTS

Referring now to the drawings, wherein like reference numerals designate identical or corresponding parts throughout the several views, the method according to the invention has been implemented using a gas-insulated switchgear assembly. The installation is initially subdivided into subsystems and analyzed. The subsystems are, in particular, the switch panels of the installation, comprising a number of high voltage switches which are associated with one another and are surrounded by sensors, actuators and busbars. The data for the sections, subdivided by subsystems and components, of the FMEA table covering all configurations are obtained on the basis of a so-called symptomatic model. A symptomatic model describes the behavior of a technical system in the event of a fault. A symptomatic model allows various fault states to be stepped through, starting from the fault state "ok" i.e. everything serviceable. In this case, the fault states correspond to the possible modes of operation of the whole installation if any component of the subsystem has failed or at least is available only to a limited extent. In the state in which the subsystem needs to be repaired, the initial state "ok" can be reverted to, for example, via appropriate repair measures.

Figure 2:
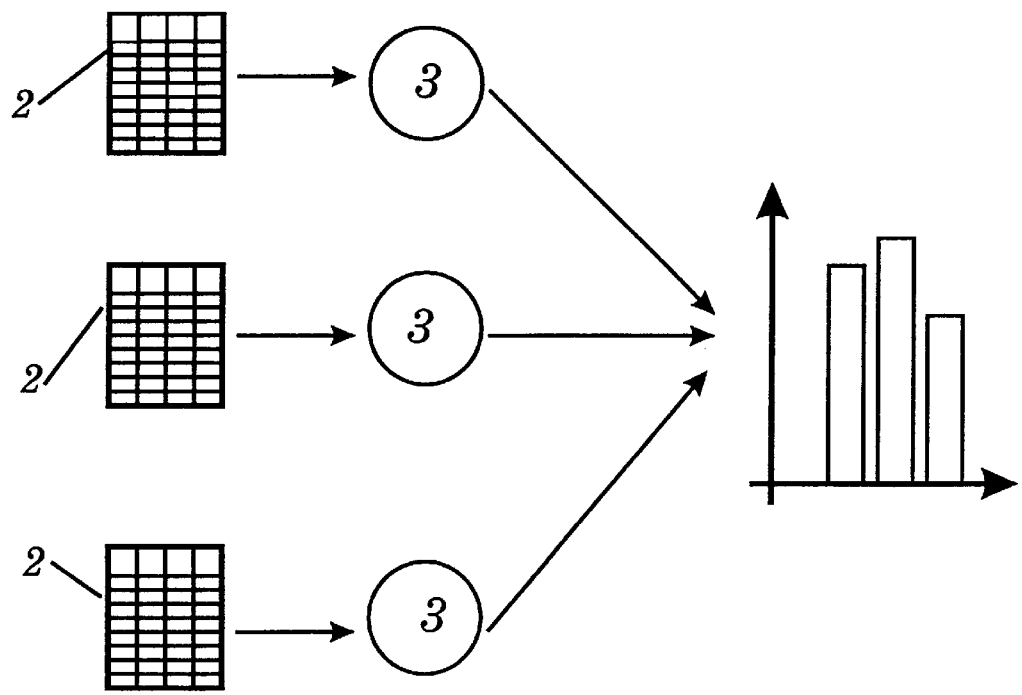
FIG. 2 shows a schematic illustration of the calculation and graphical display of the reliability characteristics using a number of configuration-specific FMEA tables.

In this way, processing takes place subsystem by subsystem and FMEA subsidiary tables are produced. A subsidiary table deals only with those failures which concern the corresponding subsystem. Configuration-restricting rules are not taken into account when producing the tables. The FMEA tables are drawn up so as to cover all configurations, i.e. all the values depending on the installation configuration are also described depending on the configuration. By lining up the FMEA subsidiary tables, the FMEA table covering all configurations is obtained for the whole system. Any configuration-specific FMEA table (2) corresponding to a configuration of interest can be extracted from the FMEA table (1) covering all configurations which has been produced in this way, and can be converted into a Markov model (3) (FIG. 1). Using the Markov model (3), various reliability characteristics are then determined and presented (FIG. 2).

In the case of the gas-insulated switchgear assembly—as in most industrial applications as well—an assembly configuration can be defined as a combination of subsystem configurations. Hence, the number of installation configurations results from the product of the number of configurations of the subsystems. A large proportion of the vast number of installation configurations would be meaningless, however, since the installation ought not to be in a corresponding configuration at all.

Hence, a rule base is additionally produced which uses individual rules to indicate the mutual dependencies amongst the configurations of the subsystems. In this way, the vast number of possible combinations can be kept in a manageable framework.

The method according to the invention therefore essentially comprises the following steps:

Production of an FMEA table covering all configurations, composed of subsidiary tables;

Extraction of configuration-specific FMEA tables from the FMEA table covering all configurations for those installation configurations which comply with the rule base;

Conversion of the extracted configuration-specific FMEA table into a Markov model, calculation and presentation of reliability characteristics.

The method according to the invention allows reliability analysis of a technical installation to be carried out at an early stage. In particular, various configurations of the installation can be weighed up against one another, and the influence of various measures on reliability can be calculated and presented. Overall, the method of the invention enables purposeful planning of the technical installation. This is of great advantage, particularly in respect of operational reliability and availability, and presents great cost saving potential.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for determining reliability characteristics for a technical installation which can exist in a multiplicity of configurations, using an FMEA table covering all configurations, for the installation, comprising, for each configuration:

failure modes and failure effects of the components of the technical installation, being produced in a first step, configuration-specific FMEA tables being extracted from the FMEA table covering all configurations in a second step, and these configuration-specific FMEA tables being used to determine and present reliability characteristics for the installation by producing Markov models from the configuration-specific FMEA tables.

2. The method as claimed in claim 1, wherein the installation comprises a number of subsystems, and a dedicated FMEA subsidiary table covering all configurations is produced for each subsystem, the FMEA subsidiary tables then being combined to form the FMEA table covering all configurations.

3. The method as claimed in claim 2, wherein the FMEA subsidiary tables covering all configurations are combined using a rule base, the rule base comprising interactions between the subsystems.

4. The method as claimed in claim 1, wherein the reliability characteristics are presented as a function of procurement costs of the technical installation.

* * * * *